(No Model.)
H. L. NICK.
TUCKING GUIDE FOR SEWING MACHINES.
No. 408,190. Patented July 30, 1889.
Fig. 1.
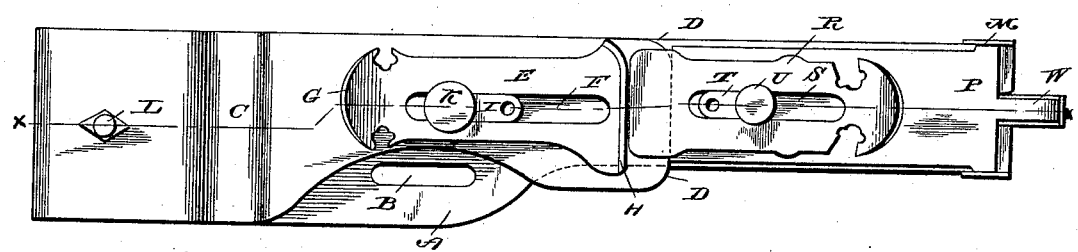
Fig. 2.
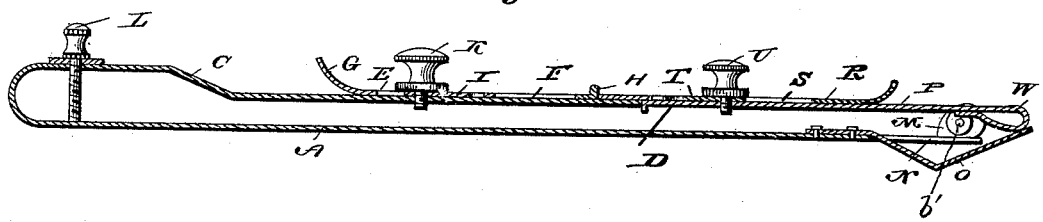
Fig. 3.
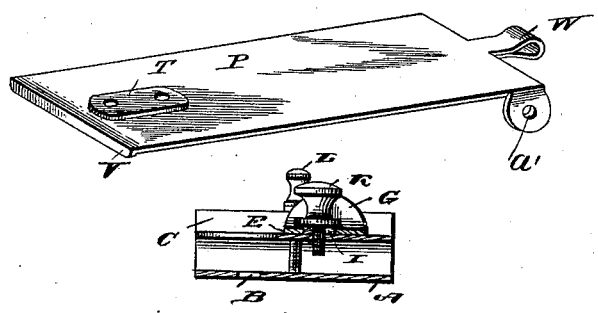
Fig. 4.
WITNESSES
INVENTOR
Henry L. Nick
By,
W. R. Stringfellow
Attorney

UNITED STATES PATENT OFFICE.

HENRY LEWIS NICK, OF NEW ORLEANS, LOUISIANA.

TUCKING-GUIDE FOR SEWING-MACHINES.

SPECIFICATION forming part of Letters Patent No. 408,190, dated July 30, 1889

Application filed September 3, 1888. Serial No. 284,414. (No model.)

*To all whom it may concern:*

Be it known that I, HENRY LEWIS NICK, a citizen of the United States, residing at New Orleans, in the parish of Orleans and State of Louisiana, have invented certain new and useful Improvements in Tucking-Guides for Sewing-Machines; and I do declare the following to be a full, clear, and exact description of the invention, such as will enable others skilled in the art to which it appertains to make and use the same.

This invention relates to that class of sewing-machine attachments known as "tucking-guides;" and it consists of a plate having at one end a hinged arm carrying adjustable pressure-plate and at the other end an arm carrying adjustable gage.

In the drawings, Figure 1 is a plan view of my improved plaiter; Fig. 2, a section on the line $x\ x$ of Fig. 1, and Fig. 3 a detail perspective view of the hinged arm for carrying the pressure-plate. Fig. 4 is a vertical cross-section taken through the lug I, plate E, and guide-frame where the screw K enters.

Referring to the drawings, A designates the base-plate carrying the several parts of the tucking-guides, and arranged to be secured to the bed-plate of a sewing-machine by a thumb-screw, as usual, a slot B being provided for the purpose. One end of the plate A is bent on itself to form an arm C, preferably a little more than half as long as the said plate A, and having its free end rounded at the edges, as shown at D. This arm C carries at its free end a gage-plate E, provided with the longitudinal slot F, an upturned end G to form a convenient handle, and the other end provided with an upwardly-extending lateral lip or flange H. The arm C is provided near its free end with a lug I on its face, which lug enters the slot F of the gage-plate and serves to guide the same. The lug I receives a thumb-screw K, which serves to clamp the gage-plate E in its adjusted position. The screw K takes into a threaded aperture in the arm C and clamps the plate E by its shouldered portion bearing thereon. The distance of the free end of the arm C from the plate A is regulated by a thumb-screw L, passing through a threaded hole in the said arm and bearing against the said plate. On the other end of the plate A, and on opposite sides thereof, are raised ears M, the said plate being provided between the said ears with a slot N for the passage of an angular spring-arm O, secured to the said plate.

Pivoted to the ears M is an arm P, (shown in detail in Fig. 3,) and carrying an adjustable pressure-plate R. This plate R consists of a flat metallic strip with a longitudinal slot S for the reception of a guiding-lug T, raised on the free end of the arm P, the said lug receiving a thumb-screw U, for holding the pressure-plate in its adjusted position, similar to that of the screw K. The arm P has on the under side of its free end a flange V, and at its hinged end has a projecting tongue W, which is arranged to bear on the spring O to depress the inner end of the arm. The arm P is also provided at its outer end with depending lugs or ears $a'$, which are perforated to match the perforations in the ears M of the plate A, so as to receive a pin $b'$, or the like, whereby a hinge-joint may be formed between the said plate and arm.

In operation the gage-plate E is adjusted with its end at a distance from the free end of the arm C equal to the width of the plait to be formed, and the plate R is adjusted so that it will rest on the free end of the arm C, nearly but not quite in contact with the gage-plate E. The cloth is passed over the plate R around and under the free end of the same, and around and under the free end of the arm C, the needle of the sewing-machine being in line with the contiguous ends of the two arms before mentioned.

It will be seen that by hinging the arm carrying the pressure-plate the cloth may be first placed around the end of the arm C, and then the pressure-plate lowered and the cloth carried back over it, thus facilitating the placing of the material in the plaiter.

Having described my invention, what I claim is—

In a tucking-guide for sewing-machines, the combination, with the base-plate having an overhanging portion C, of a set-screw for regulating the distance between the free end of the same and the frame, the gage-arm having the slot F and a flange at its forward end, a guide-lug entering the slot, and the set-nut passing into a threaded aperture in the branch C of the tucking-guide frame and through the guide-lug and the shoulder bearing on the gage-arm to hold the latter in position, the arm P, hinged to one end of the guide-frame and having a projecting tongue W, the spring secured to the guide-frame and bearing against said tongue to depress the inner end of the arm P, and the pressure-plate adjustably secured to said arm by means of a set-nut, substantially as specified.

In testimony whereof I affix my signature in presence of two witnesses.

HENRY LEWIS NICK.

Witnesses:
    THOMAS WAGGONER,
    PERCY D. PARKS.